United States Patent [19]
Tijerina

[11] Patent Number: 6,015,177
[45] Date of Patent: Jan. 18, 2000

[54] VEHICULAR STORAGE UNIT TRANSIT SYSTEM

[76] Inventor: Raul Tijerina, 4701 N. 487th Ave., Tonopah, Ariz. 85354

[21] Appl. No.: 08/997,497

[22] Filed: Dec. 23, 1997

[51] Int. Cl.[7] .................. B60R 5/00; B60R 7/00; B60N 3/12
[52] U.S. Cl. .............. 296/37.6; 296/37.1; 224/401; 224/281
[58] Field of Search .................. 296/37.6, 37.1; 224/401, 402, 403, 281; 414/529, 522, 679, 507, 491, 494; 198/750.1, 468.6

[56] References Cited

U.S. PATENT DOCUMENTS

| | | | |
|---|---|---|---|
| 3,826,529 | 7/1974 | Wood | 296/37 |
| 3,874,538 | 4/1975 | Kessler et al. | 414/507 |
| 4,522,326 | 6/1985 | Tuohy, III | 296/37.6 |
| 4,635,992 | 1/1987 | Hamilton et al. | 296/37.6 |
| 4,645,405 | 2/1987 | Cambiano | 414/494 |
| 4,740,132 | 4/1988 | Peyre | 414/494 |
| 4,889,464 | 12/1989 | Self | 414/491 |
| 4,904,144 | 2/1990 | Phillips | 414/494 |
| 5,037,153 | 8/1991 | Stark | 296/37.6 |
| 5,054,605 | 10/1991 | Bavis | 198/750.1 |
| 5,085,554 | 2/1992 | Kirchhoff et al. | 414/491 |
| 5,088,636 | 2/1992 | Barajas | 224/281 |
| 5,121,959 | 6/1992 | King | 296/37.6 |
| 5,476,353 | 12/1995 | Mola | 414/507 |
| 5,556,249 | 9/1996 | Heine | 414/494 |
| 5,582,501 | 12/1996 | Meyer | 414/491 |
| 5,836,636 | 11/1998 | Adams | 414/507 |

FOREIGN PATENT DOCUMENTS

| | | | |
|---|---|---|---|
| 156576 | 12/1904 | Germany | 414/507 |
| 1572857 | 6/1990 | U.S.S.R. | 414/507 |

*Primary Examiner*—Joseph D. Pape
*Assistant Examiner*—Lori L. Coletta
*Attorney, Agent, or Firm*—Meschkow & Gresham, P.L.C.; Jordan M. Meschkow; Lowell W. Gresham

[57] ABSTRACT

A vehicular storage unit transit system (20) is provided for joining a storage unit (32) to a vehicle (30) possessing a cargo area (28) having a forward end (38), an access end (42), a pair of opposing sidewalls (46), and a floor (50) with a pair of wheelwells (56) protruding thereabove between the sidewalls (46). A pair of transit assemblies (22) couple the storage unit (32) to a pair of guidance assemblies (24). A first section (76) of each guidance assembly (24) sustains the storage unit (32) in a first position (36) proximate the forward end (38) and in a first attitude (54) substantially parallel to the floor (50). A second section (82) of each guidance assembly (24) sustains the storage unit (32) in a second position (40) proximate the access end (42) and in a second attitude (66) oblique to the floor (50).

19 Claims, 5 Drawing Sheets

VEHICULAR STORAGE UNIT TRANSIT SYSTEM

TECHNICAL FIELD OF THE INVENTION

The present invention relates to transit systems for vehicular storage units. More particularly, the present invention relates to vehicular storage unit transit systems configured to be mounted in a cargo area of a vehicle and to effect transit of a storage unit upward and over wheelwells of the vehicle.

BACKGROUND OF THE INVENTION

It is often desirable to place a storage unit within the cargo area of a vehicle. In a common usage, this takes the form of placing a crossbody toolbox in the bed of a pickup truck. Such a toolbox markedly increases the utility of the truck by allowing tools, components, and other items to be stored out of the weather and simultaneously be secured against theft and damage.

Off-the-shelf crossbody toolboxes are common aftermarket items for both full-size and mini pickup trucks, and are readily available in a variety of depths and front-to-back lengths to suit various storage needs. Being off-the-shelf items, such crossbody toolboxes are relatively inexpensive and provide a significant savings over the use of custom toolboxes. This serves to increase their popularity.

Conventionally, a crossbody toolbox is mounted within a truck bed proximate the cab. With such a cab-proximate mounting, all of the truck bed beyond the toolbox remains accessible from the tailgate and is left free for use with other cargo.

A problem exists when a crossbody toolbox is mounted in the conventional cab-proximate position. An individual normally accesses the contents of a toolbox so mounted while standing adjacent to the side of the truck. This limits access to items stored within reach of the individual. Items within the toolbox that are on the opposite side of the truck from the position of the individual are not readily accessible. The individual must then move around the truck to access those items. This solution often poses both an inconvenience and a loss of time for the individual.

A related problem exists when items are stored within a central portion of the bottom of the crossbody toolbox. With the exception of shallow toolboxes, such items may be beyond the reach of the individual. The magnitude of this problem is a function of the depth of the toolbox. That is, the deeper the toolbox, the greater the unreachable area within the toolbox. For deep toolboxes and/or individuals of less than average stature, this problem can become severe.

Compensation for the unreachable-area problem may be made by not storing items within those areas. This may be facilitated by partially filling the unreachable areas within the toolbox with padding or other materials. This solution to one problem creates a different problem by reducing the volume of the toolbox, hence reducing its utility.

Alternatively, compensation for the unreachable-area problem may be made by accessing the contents of the toolbox from within the truck bed. In this manner, each item within the toolbox may be accessed, regardless of where in the toolbox it may be stored. This solution, too, creates another problem by forcing the individual to enter and leave the truck bed to effect access. As above, this solution poses both an inconvenience and a loss of time for the individual. Additionally, both the acts of entering and leaving the truck bed and of maneuvering among other cargo stored therein pose a danger of injury to the individual.

From an access point of view, a crossbody toolbox would ideally be mounted proximate the tailgate. This would allow the entirety of the contents of the toolbox to be accessed while standing adjacent to the truck. This is not a practical solution, however, as the remainder of the truck bed would not then be accessible via the tailgate. The individual would be obliged to load and/or unload additional cargo by lifting that cargo upward and over the sidewalls of the truck bed. This action is inconvenient at best, and may well be impossible for certain heavy cargoes.

Additionally, a crossbody tool box may itself have a gross weight (toolbox and contents) of several hundred pounds. Placing such a load proximate the tailgate and behind the rear axle may constitute an improper and unsafe loading of the truck, especially if there is no other cargo. Operating the truck under such load conditions may create a driving hazard.

Ideally, a crossbody toolbox should be located within (across) the truck bed proximate the cab for truck-loading purposes and proximate the tailgate for access purposes. A plurality of existing schemes have been developed to fulfill this idealized situation and have met with varying degrees of success. Typically, these schemes involve rollers or other devices affixed to the toolbox and coupled to tracks or other mechanisms affixed to some portion of the truck bed. Through these rollers and tracks, the toolbox may be placed in a stowage position proximate the cab while the truck is in use, then moved to an access position proximate the tailgate to facilitate access to the contents of the toolbox as required. While providing solutions to the fundamental stowage and access problems discussed above, each of these schemes has problems of its own.

A problem exists, for example, when the tracks are positioned flush upon the floor of the truck bed. Being floor-mounted, such tracks are prone to damage from other cargo placed in the truck bed and to clogging from dirt and debris. Additionally, most standard crossbody toolboxes would require extensive mounting brackets or other arrangements so as to properly couple with floor-mounted tracks. This scheme does have maximal mounting strength, however, and therefore tends to be used with custom toolboxes or other storage units whose gross weight tends to suggest floor mounting.

A problem also exists when the tracks are placed atop the sidewalls of the bed. Being top-mounted, such tracks are prone to damage when cargo is temporarily place atop the sidewalls as it is loaded or unloaded from the truck bed. Additionally, top-mounted tracks increases the overall height of the toolbox. An increase in height inhibits access to the contents of the toolbox by raising the lip of the toolbox over which an individual must reach to retrieve an item. This may be especially problematical for individuals of less than average stature.

A crossbody toolbox transit scheme utilizing sidewall-mounted tracks within the truck bed provides the best of the track-and-roller methodologies. In such a scheme, the track is mounted upon the insides of the sidewalls, minimizing the potential for damage from either other in-bed cargo and external objects. Also, such a track has a minimal potential for clogging from dirt and other debris. Additionally, such a track does not add to the mounting height of the toolbox nor increases difficulty of access. With this scheme, the crossbody toolbox may easily be moved between a stowage position proximate the truck cab and an access position proximate the tailgate.

For track-mounted, movable crossbody toolboxes, regardless of the track mounting position, a problem exists in that in order to effect a transit from a cab-proximate stowage position to a tailgate-proximate access position, the toolbox must pass over the wheelwells. All but the shallowest of standard (off-the-shelf) crossbody toolboxes have sufficient depth so as to extend below the height of the wheelwells within the truck bed when the toolbox rests upon the tops of the sidewalls. One solution to this problem is to mount the toolbox to the tracks in a raised position so that the bottom of the toolbox clears the wheelwells during transit. This solution may significantly increase the difficulty of access to the contents of the toolbox.

Another solution to the wheelwell-height problem is to use a toolbox configured so that only a portion capable of passing between the wheelwells extends below the height of the wheelwells. This solution usually necessitates the use of a custom crossbody toolbox, significantly increases the toolbox cost, and is incompatible with the existing infrastructure of existing crossbody toolboxes.

An additional problem exists in that standard crossbody toolboxes have mounting planes coincident with the tops of the sidewalls of the truck bed. Relative to the ground, this is sufficiently high with many pickup trucks, especially four-wheel drive pickup trucks, so as to cause the access to all the contents of the toolbox to be difficult at best, even when the toolbox in an access (tailgate-proximate) position.

Yet another problem exists with existing toolbox-transit systems in that a crossbody toolbox and its contents may posses a significant gross weight, often several hundred pounds or more. Should the truck be parked on an incline, manually moving the toolbox between the stowage position proximate the cab and the access position proximate the tailgate may become a significant chore. Indeed, if either the toolbox gross weight or the truck incline is sufficient, the task may be impossible for the individual involved.

A related problem exists in that if the either the mass of the toolbox or the incline of the truck is sufficient, the toolbox may break free of the control of the individual during transit, resulting in possible injury to the individual or damage to the toolbox or its contents, the tracks, or the truck bed.

What is needed is a crossbody toolbox transit system capable of easily effecting a transit of a standard (off-the-shelf) crossbody toolbox between a cab-proximate stowage position and a tailgate-proximate access position in a bed of a pickup truck, wherein the access position allows easy and convenient access to all items within the toolbox even to an individual of less than average stature.

SUMMARY OF THE INVENTION

Accordingly, it is an advantage of the present invention that it provides a vehicular storage unit transit system having tracks (guidance assemblies) configured to guide a crossbody toolbox (storage unit) during a transit between a stowage position and an access position in a cargo area (truck bed) of a vehicle (pickup truck).

It is another advantage of the present invention that, when in the stowage position, the bottom of the crossbody toolbox is lower than the top of wheelwells protruding from the floor of the truck bed.

It is another advantage of the present invention that, when in the access position, the bottom of the crossbody toolbox is lower than the top of the wheelwells protruding from the floor of the truck bed.

It is another advantage of the present invention that the crossbody toolbox, when in the access position, is maintained in an access attitude to facilitate access to items contained within the crossbody toolbox by an individual of less than average stature.

The above and other advantages of the present invention are realized in one form by a vehicular storage unit transit system for joining a storage unit to a vehicle possessing a cargo area. The cargo area has a floor with a pair of wheelwells protruding thereabove. The wheelwells have a highest point, being a point on the wheelwells furthest removed from the floor. The storage unit has a lowest point, being a point on the storage unit least removed from the floor. The transit system has a pair of transit assemblies coupled to the storage unit, and a pair of guidance assemblies coupled to the transit assemblies and the cargo area. The guidance assemblies are configured to guide the storage unit during a transit thereof between a stowage position and an access position while passing through a transit position. The lowest point of the storage unit is less removed from the floor than the highest point of the wheelwells when the storage unit is in either the stowage or access position, and more removed from the floor when the storage unit is in the transit position.

The above and other advantages of the present invention are realized in another form by a vehicular storage unit transit system for joining a storage unit to a vehicle possessing a cargo area having a pair of opposing sidewalls, a forward end, and an access end opposing the forward end. The transit system has a pair of guidance assemblies coupled to the sidewalls. Each guidance assembly has a first section configured to sustain the storage unit in a stowage attitude at a stowage position proximate the forward end of the cargo area, and an access section configured to sustain the storage unit in an access attitude at an access position proximate the access end of the cargo area.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
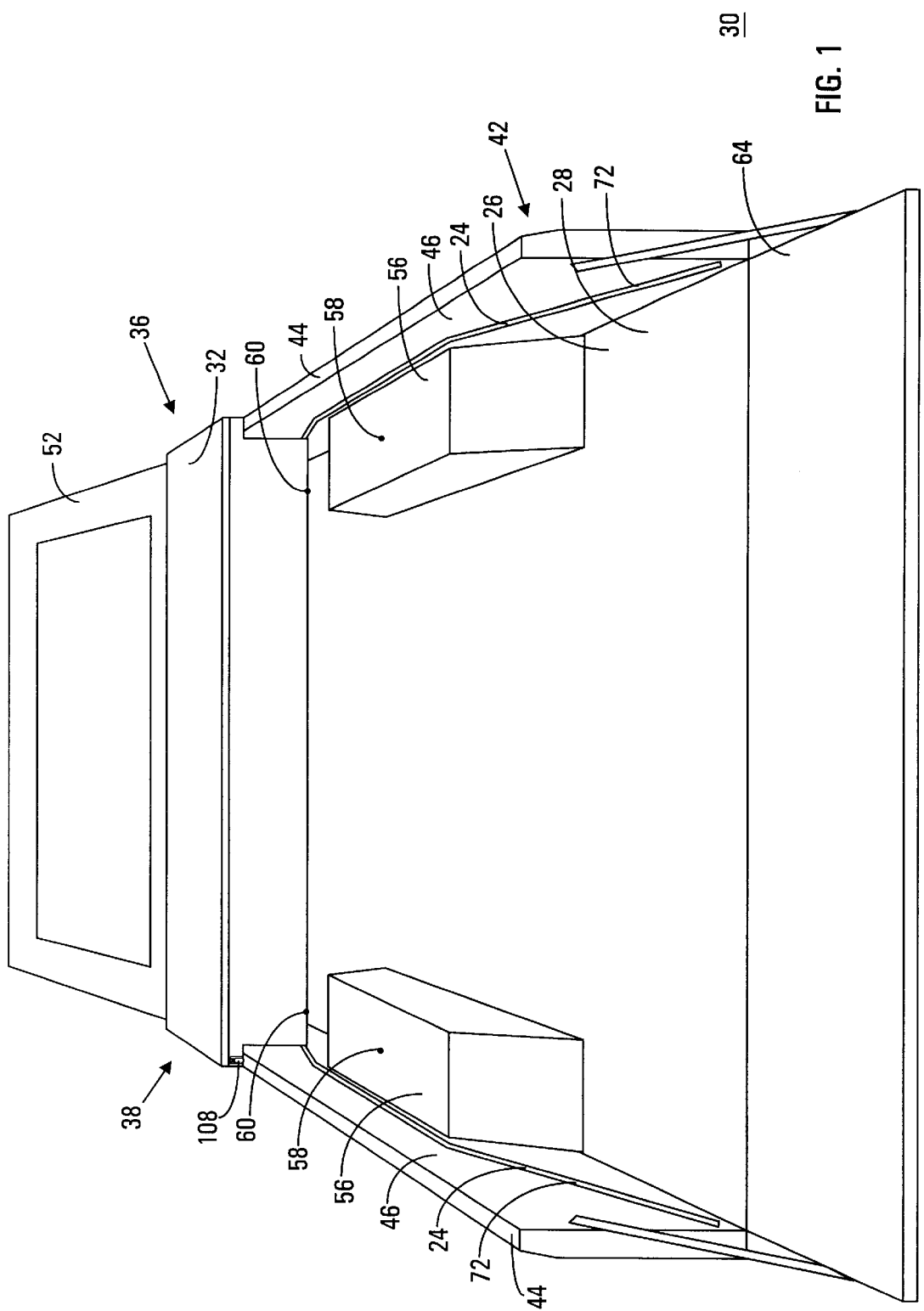
FIG. 1 depicts a rear perspective view of a vehicular storage unit transit system in accordance with a preferred embodiment of the present invention.
Figure 2:
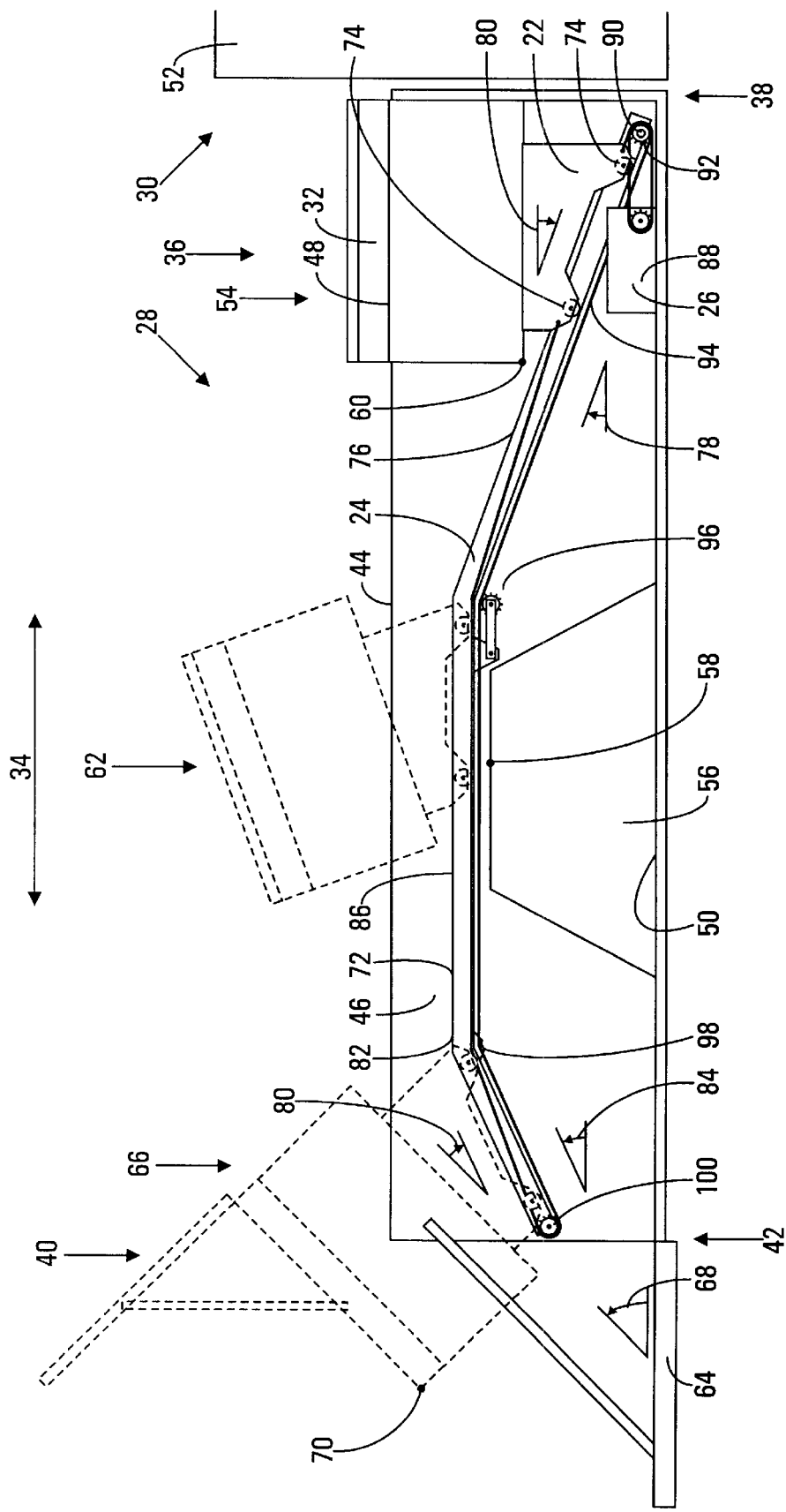
FIG. 2 depicts a cut away side view of a vehicular storage unit transit system in accordance with a preferred embodiment of the present invention.

FIG. 1 depicts a rear perspective view of a vehicular storage unit transit system 20 and FIG. 2 depicts a cut away side view of vehicular storage unit transit system 20 in accordance with a preferred embodiment of the present invention. The following discussion refers to FIGS. 1 and 2.

Vehicular storage unit transit system 20 includes a pair of transit assemblies 22 (one shown), a pair of guidance assemblies 24, and a drive assembly 26 mounted within a cargo area 28 of a vehicle 30. A storage unit 32 is coupled to transit assemblies 22. Transit system 20 functions to effect a transit 34 of storage unit 32 between a stowage position 36 at a forward end 38 of cargo area 28 and an access position 40 at an access end 42 of cargo area 28, with access end 42 opposing forward end 38.

In the exemplary embodiments used throughout this discussion, vehicle 30 is a pickup truck, cargo area 28 is a truck bed, and storage unit 32 is a crossbody toolbox. Within this discussion, the terms "crossbody toolbox," "truck bed," and "pickup truck" shall be taken to be synonymous with the terms "storage unit," "cargo area," and "vehicle," respectively.

Those skilled in the art will appreciate that, while the present invention is intended for use with standard or off-the-shelf crossbody toolboxes 32 within truck beds 28 of conventional pickup trucks 30, the present invention is not limited to such use. The present invention may readily be used with any of a wide variety of storage units 32 within any of a wide variety of cargo areas 28 of any of a wide variety of vehicles 30.

As depicted in FIG. 1, crossbody toolbox 32 has a "T" shape. In a conventional fixed mounting, i.e., a mounting of crossbody toolbox 32 into forward end 38 of truck bed 28 of pickup truck 30 without transit system 20, the undersides of the arms of the "T" are mounted to tops 44 of sidewalls 46. A plane at the undersides of the arms of the "T" therefore constitutes a mounting plane 48 of crossbody toolbox 32. Mounting plane 48 provides a referent for an attitude of toolbox 32. That is, in the conventional fixed mounting described herein, mounting plane 48 is affixed and hence substantially parallel to sidewall tops 44. By extension, mounting plane 48 is substantially parallel to a floor 50 of truck bed 28. Since mounting plane 48 is the referent for the attitude of crossbody toolbox 32, crossbody toolbox 32 is substantially parallel to floor 50 of truck bed 28.

Those skilled in the art will appreciate that other (non-crossbody) toolboxes may have as referents other mounting planes which, when the toolbox is mounted as normally intended, are substantially parallel to floor 50. Reference within this discussion to mounting plane 48 of crossbody toolbox 32 and to the attitude of crossbody toolbox 32 shall be taken to be equivalent to the mounting plane of any other toolbox and to the attitude of that other toolbox.

When in stowage position 36, crossbody toolbox 32 is positioned proximate forward end 38 of truck bed 28. That is, crossbody toolbox 32 is proximate a cab 52 of pickup truck 30. When in stowage position 36, crossbody toolbox 32 has an attitude such that mounting plane 48 is substantially coincident with sidewall tops 44. Therefore, when in stowage position 36, crossbody toolbox 32 has a stowage attitude 54 substantially parallel to floor 50.

When in stowage position 36, crossbody toolbox 32 is in a suitable position and at a suitable attitude for pickup truck 30 to be driven. Crossbody toolbox 32 is stowed for transport, with minimal risk of damage to crossbody toolbox 32, contents (not shown) contained therein, pickup truck 30, or any associated individuals.

Those skilled in the art will appreciate that when in stowage position 36, crossbody toolbox 32 may be accessed in a conventional manner. That is, it may be accessed from beside pickup truck 30 or within truck bed 28 as though it were fixed-mounted.

Truck bed 28 has a pair of wheelwells 56 protruding through floor 50 proximate sidewalls 46. Each of wheelwells 56 has a highest point 58, which constitutes that point of each wheelwell 56 farthest from the plane of floor 50. Similarly, crossbody toolbox 32 has a lowest point 60, which constitutes that point of crossbody toolbox 32 closest to floor 50 when crossbody toolbox is in stowage position 36 and stowage attitude 54.

With a conventional off-the-shelf crossbody toolbox 32 in stowage position 36, lowest point 60 is normally closer to floor 50 than highest point 58. That is, the depth of crossbody toolbox 32 is normally greater than the distance between sidewall tops 44 and wheelwells 56.

Therefore, when effecting transit 34 of crossbody toolbox 32 between stowage position 36 and access position 40, transit system 20 causes crossbody toolbox to pass through a transit position 62 where lowest point 60 of crossbody toolbox 32 is farther from floor 50 than highest point 58 of wheelwell 56. That is, transit system 20 passes crossbody toolbox 32 upward and over wheelwells 56. Transit position 62 is any of a plurality of positions wherein crossbody toolbox is above wheelwells 56.

Access position 40 is located at access end 42 of truck bed 28 and opposes stowage position 36 at forward end 38. Access position 40, therefore, is proximate a tailgate 64 of pickup truck 30.

Were crossbody toolbox 32 to be in an attitude substantially identical to stowage attitude 54 when in access position 40, access to the contents (not shown) of crossbody toolbox 32 would be greatly facilitated. That is, if mounting plane 48 were substantially coincident with sidewall tops 44 when crossbody toolbox 32 is proximate tailgate 64 of an average-height pickup truck 30, an individual of normal stature standing behind tailgate 64 may readily access the contents of crossbody toolbox 32. However, if pickup truck 30 is of more than average height, as may be the case with customized or four-wheel drive pickup trucks 30, or if the individual involved is of less than average stature, then the height of the top of crossbody toolbox 32 may be such as to obligate the individual involved to mount tailgate 64 to effect access to the contents of crossbody toolbox 32.

To facilitate access to the contents (not shown) of crossbody toolbox 32 when in access position 40, crossbody toolbox assumes an access attitude 66. In access attitude 66, crossbody toolbox 32 is tilted towards tailgate 64. In the preferred embodiment depicted in FIG. 2, crossbody toolbox 32, when in access attitude 66, has an access angle 68 of approximately 45° relative to floor 50. Access angle 68 sufficiently lowers a trailing lip 70 of crossbody toolbox 32 so that an individual may easily view, retrieve, or replace the contents, yet is insufficient to cause those contents to fall out of crossbody toolbox 32.

Those skilled in the art will appreciate that access angle 68 may be any of a plurality of angles, and that the angle selected for access angle 68 may be dependent to some degree upon the use for which storage unit 32 is to be placed. For example, were storage unit 32 to contain a single large, heavy, and appropriately secured object, access angle 68 may be 90° to facilitate the loading and unloading of the object. Conversely, were storage unit 32 to contain a myriad of small parts, access angle 68 may be a shallow angle (15°–20°) sufficient to facilitate access while inhibiting the displacement and mixing of the parts during transit 34.

The disparity between stowage attitude 54 and access attitude 66 is effected by transit assemblies 22 and guidance assemblies 24. Guidance assemblies 24 include tracks 72. In the preferred embodiment, the form of tracks 72 is that of a "C"-channel, with rollers 74 of transit assemblies 22 rolling within the "C". Furthermore, in the preferred embodiment, tracks 72 are bolted or otherwise affixed to sidewalls 46. Those skilled in the art will appreciate that the shape and manner of mounting of tracks 72 is not a function of the present invention. Other shapes and other mounting methodologies may be used without departing from the spirit and intent of the present invention.

Tracks 72 guide rollers 74 of transit assemblies 22 when storage unit 32 is effecting a transit 34 between stowage position 36 and access position 40. A combination of various angles determine the instantaneous attitude of crossbody toolbox 32 at any position during transit 34.

Tracks 72 have stowage sections 76. Stowage sections 76 are those portions of tracks 72 engaging rollers 74 when crossbody toolbox 32 is in or near stowage position 36. In the preferred embodiment, stowage sections 76 are not parallel to floor 50, but rather incline upwards away from forward end 38 at a stowage-section angle 78 relative to floor 50. In the preferred embodiment depicted in FIG. 2, stowage-section angle 78 is approximately 20°.

Since, when in stowage position 36, crossbody toolbox 32 effects a stowage attitude 76 substantially parallel to floor 50, transit assemblies 22 are configured so that rollers 74 engage tracks 72 so as to offset stowage-section angle 78. That is, the plane of rollers 74 has a toolbox/track angle 80 relative to mounting plane 48 such that the sum of stowage-section angle 78 and toolbox/track angle 80 is substantially zero. In the preferred embodiment depicted in FIG. 2, toolbox/track angle 80, like stowage-section angle 78, is approximately 20°.

Those skilled in the art will appreciate that having stowage sections 76 of tracks 72 incline upwards away from forward end 38 is not a requirement of the present invention. However, by having stowage sections 76 so angled, crossbody toolbox 32 touches sidewall tops 44 only when in stowage position 36. This eliminates the possibility of dragging crossbody toolbox 32 along sidewall tops 44, and serves to inhibit damage to and preserve the value of pickup truck 30. In practice, many individuals cushion the interface between crossbody toolbox 32 and sidewall tops 44 by placing a padding (typically rubber, plastic, or felt) either under the "T" arms of crossbody toolbox 32 or along that portion of sidewall tops 44 where contact with crossbody toolbox 32 is made. Such padding, also, is not a requirement of the present invention.

At the opposite end of transit 34, when in access position 40, crossbody toolbox 32 assumes access attitude 66. To accomplish this, tracks 72 have access sections 82 that incline downwards towards access end 42 at an access-section angle 84 relative to floor 50 such that the sum of access-section angle 84 and toolbox/track angle 80 is substantially equal to access angle 68. In the preferred embodiment depicted in FIG. 2, access angle 68 is approximately 45° and toolbox/track angle is approximately 20°. Access-section angle, therefore, is approximately 25°.

Figure 3:
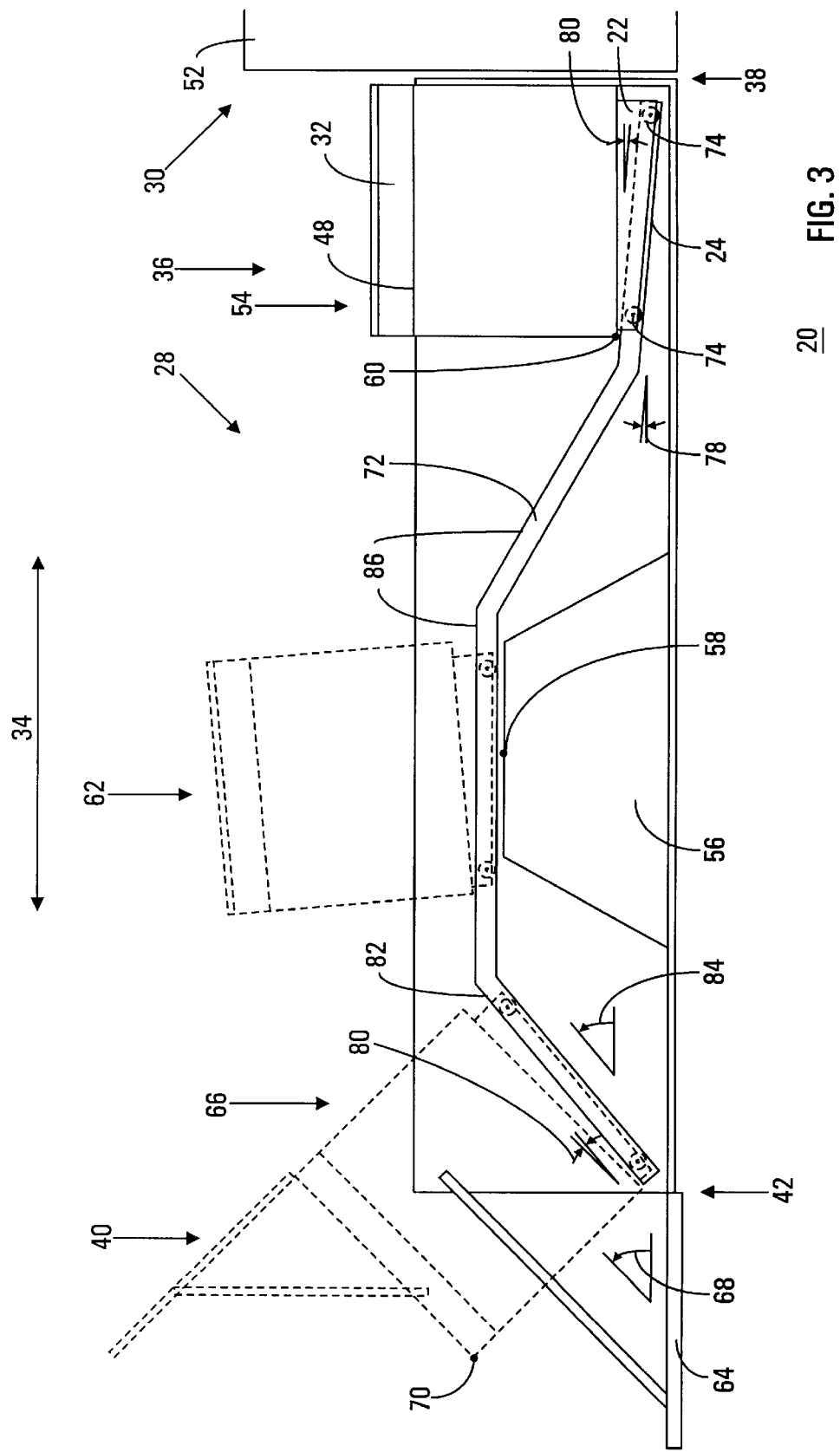
FIG. 3 depicts a cut away side view of a portion of an alternative vehicular storage unit transit system in accordance with a preferred embodiment of the present invention.

FIG. 3 depicts a cut away side view of a portion of an alternative vehicular storage unit transit system 20 in accordance with a preferred embodiment of the present invention. The following discussion refers to FIGS. 2 and 3.

The actual angles used for toolbox/track angle 80, stowage-section angle 78, and access-section angle 84, and access angle 68 depend in part upon the dimensions of crossbody toolbox 32, in part upon the dimensions of truck bed 28, and in part upon the angle desired for access angle 68. In FIG. 2, a relatively common type of off-the-shelf crossbody toolbox 32 is depicted. This form of crossbody toolbox 32 extends downward between sidewall tops 44 and floor 50. In this instance, the distance between lowest point 60 of crossbody toolbox 32 and floor 50, the distance between highest points 58 of wheelwells 56, and the distance between wheelwells 56 and forward end 38 allow a value of approximately 20° to be used for stowage-section angle 78. It follows that toolbox/track angle 80 is also approximately 20° and, for an access angle 68 of approximately 45°, that stowage-section angle 78 is approximately 25°. Stowage sections 54 and access sections 66 of tracks 72 are coupled by a transit section 86 passing over wheelwells 56 substantially parallel to floor 50.

In FIG. 3, however, an especially deep crossbody toolbox 32 is used. This only allows for a toolbox/track angle 80 of approximately 5°. In this case then, it follows that stowage-section angle 78 is also approximately 5° and, for an access angle 68 of approximately 45°, that stowage-section angle 78 is approximately 40°. Stowage sections 54 and access sections 66 of tracks 72 are coupled by a transit section 86, a portion of which passes over wheelwells 56 substantially parallel to floor 50, and a portion of which couples the parallel portion thereof to stowage section 76.

Figure 4:
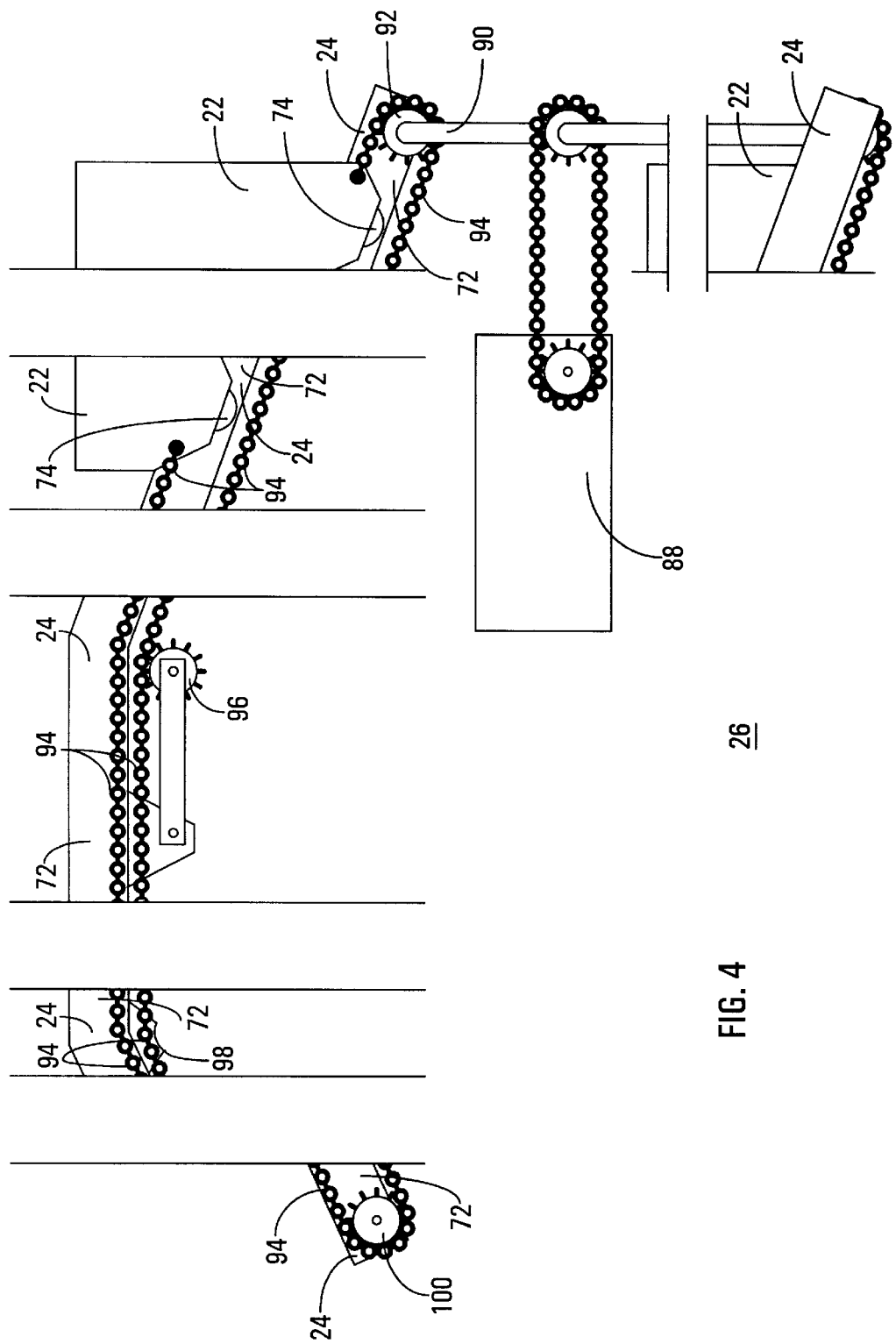
FIG. 4 depicts a schematic representation of a drive assembly for a vehicular storage unit transit system in accordance with a preferred embodiment of the present invention.

FIG. 4 depicts a schematic representation of drive assembly 26 for vehicular storage unit transit system 20 in accordance with a preferred embodiment of the present invention. The following discussion refers to FIGS. 2 and 4.

Crossbody toolbox 32, when fully loaded, may have considerable gross weight, often several hundred pounds. When effecting transit 34 between stowage position 36 and access position 40, crossbody toolbox 32 would normally be raised to pass through transit position 62. Were transit 34 to be effected manually, this may be difficult for some individuals. Transit system 20, therefore, includes drive assembly 26.

In the form depicted in FIG. 2 and shown schematically in FIG. 4, drive assembly 26 is an electrically powered chain drive assembly 26 (drive assembly 26 has been omitted from FIGS. 1 and 3 for the sake of clarity).

Chain drive assembly 26 includes a drive unit 88, coupled to a drive shaft 90. Drive shaft 90 has a pair of drive sprockets 92 coupled to the pair of guidance assemblies 24, only one of which is shown. Each drive sprocket 92 drives a drive chain 94, each end of which is coupled to transit assembly 22. A tensioner sprocket 96 is used to maintain tension upon drive chain 94, which negotiates corners by a combination of skids 98, idler sprockets 100, and/or by simply sliding over the inside of track 72. Through this linkage, drive unit 88 effects transit 34 of crossbody toolbox 32 between stowage position 36 and access position 40.

Figure 5:
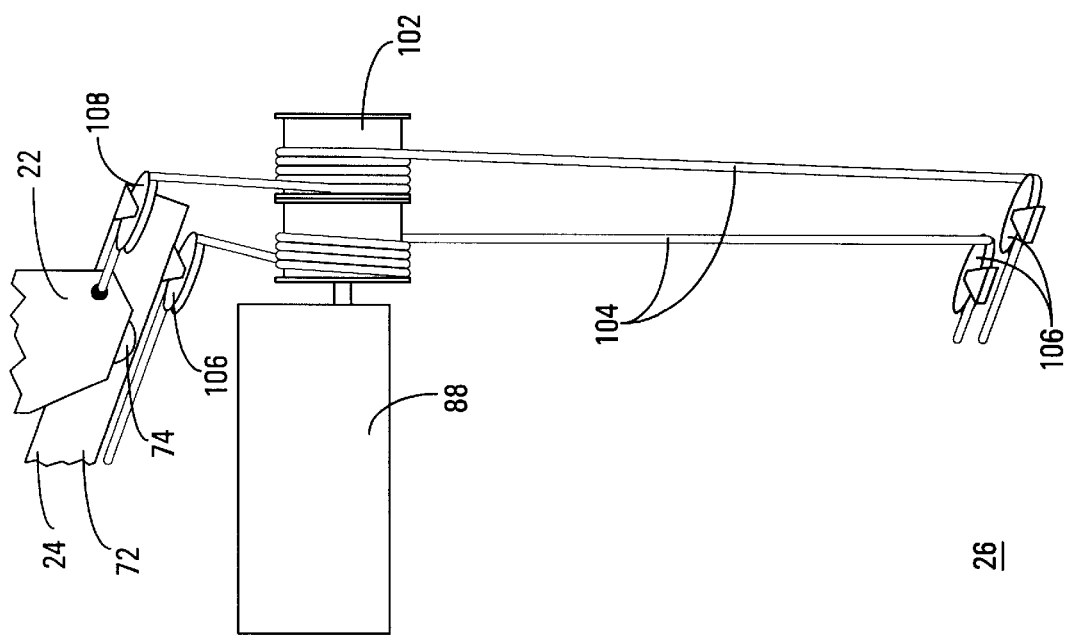
FIG. 5 depicts a schematic representation of a portion of an alternative drive assembly for a vehicular storage unit transit system in accordance with a preferred embodiment of the present invention.

FIG. 5 depicts a schematic representation of a portion of an alternative drive assembly for a vehicular storage unit transit system in accordance with a preferred embodiment of the present invention. The following discussion refers to FIGS. 2 and 5.

A variation on drive assembly 26 discussed above may be a cable drive assembly 26. In FIG. 5, drive unit 88 has a drive drum 102 which drives a pair of drive cables 104. Drive cables 104 couple to guidance assemblies 24 and transit assemblies 22 through idler pulleys 106.

Those skilled in the art will appreciate that in the present invention drive assembly 26 is not limited to the exemplary chain drive and cable drive methodologies discussed above. There are a multiplicity of ways in which drive assembly 26 may be implemented. Furthermore, drive assembly 26, being electrical, requires a control circuit, implementation of which is also well known to those skilled in the art.

In will also be appreciated by those skilled in the art that drive assembly 26, while desirable because of the potential gross weight of crossbody toolbox 32, is not a requirement of the present invention in all its forms. Omission of drive assembly 26 does not depart from the spirit and intent embodied within the present invention.

The following discussion refers to FIGS. 1 and 2.

In order to safely drive pickup truck 30 and transport crossbody toolbox 32, it is desirable that crossbody toolbox be secured into stowage position 36.

In the preferred embodiment, this is carried out by using for drive unit 88 (FIG. 2) a locking drive unit 88. A locking drive unit 88 is one so constructed that, in the absence of power, the output shaft or other coupling mechanism is prevented from being moved, e.g., a worm-gear unit. Locking drive unit 88 is, in effect, a latch assembly 108.

Alternatively, latch assembly 108 may be a separate entity, such as a barrel bolt, used to physically latch crossbody toolbox 32 into stowage position 36, as depicted in FIG. 1.

In summary, the present invention provides transit system 20 in which drive assembly 26 effects transit 34 of storage unit 32 between stowage position 36 at forward end 38 of cargo area 28 of vehicle 30 and access position 40 at access end 42 of cargo area 28. Transit 34 is effected by raising storage unit 32 sufficiently to pass through transit position 62 over wheelwells 56 protruding through floor 50 of cargo area 28. When in stowage position 36, storage unit 32 is maintained in stowage attitude 54, which attitude is optimized for stowage of storage area 32 for transport when vehicle 30 is in motion. When is access position 40, storage unit is maintained in access attitude 66, which attitude is optimized for access to contents (not shown) of storage unit 32.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A vehicular storage unit transit system for joining a storage unit to a vehicle possessing a cargo area having a floor and a pair of wheelwells protruding above said floor, said wheelwells having a highest point, said highest point being a point furthest removed from said floor, said storage unit having a lowest point, said lowest point being a point least removed from said floor, and said transit system comprising:

a pair of transit assemblies configured to be coupled to said storage unit; and a pair of guidance assemblies coupled to said transit assemblies and configured to be coupled to said cargo area, said guidance assemblies being configured to guide said storage unit during a transit thereof between a first position and a second position by passing through a third position, wherein said lowest point of said storage unit is less removed from said floor than said highest point of said wheelwells when said storage unit is in one of said first position and said second position, and said lowest point of said storage unit is more removed from said floor than said highest point of said wheelwells when said storage unit is in said third position.

2. A vehicular storage unit transit system as claimed in claim 1 wherein said lowest point of said storage unit is less removed from said floor than said highest point of said wheelwells when said storage unit is in said second position.

3. A vehicular storage unit transit system as claimed in claim 2 wherein said lowest point of said storage unit is less removed from said floor than said highest point of said wheelwells when said storage unit is in said first position.

4. A vehicular storage unit transit system as claimed in claim 1 wherein:

said cargo area has a forward end and an access end opposing said forward end;

said first position is proximate said forward end; and said second position is proximate said access end.

5. A vehicular storage unit transit system as claimed in claim 1 wherein each of said guidance assemblies comprises:

a first section configured to sustain said storage unit in a first attitude when in said first position; and a second section configured to sustain said storage unit in a second attitude when in said second position.

6. A vehicular storage unit transit system as claimed in claim 5 wherein:

said storage unit has a mounting plane;

said mounting plane is substantially parallel to said floor when said storage unit is in said first attitude; and said mounting plane is oblique to said floor when said storage unit is in said second attitude.

7. A vehicular storage unit transit system as claimed in claim 6 wherein said second attitude is configured to facilitate inspection and retrieval of contents of said storage unit.

8. A vehicular storage unit transit system as claimed in claim 5 wherein each of said guidance assemblies additionally comprises a third section coupling said first section to said second section and configured to guide said storage unit during a transit thereof over said wheelwells.

9. A vehicular storage unit transit system as claimed in claim 1 wherein:

said cargo area has a pair of opposing sidewalls; and said guidance assemblies are affixed to said sidewalls.

10. A vehicular storage unit transit system as claimed in claim 1 additionally comprising a drive assembly coupled to at least one of said transit assemblies.

11. A vehicular storage unit transit system as claimed in claim 10 wherein:

said cargo area has a forward end and an access end opposing said forward end;

each of said guidance assemblies comprises a first section configured to sustain said storage unit in said first position proximate said forward end;

each of said guidance assemblies additionally comprises a second section configured to sustain said storage unit in said second position proximate said access end;

each of said guidance assemblies additionally comprises a third section coupling said first section and said second section and configured to guide said storage unit when undergoing a transit between said first position and said second position; and said transit is effected by said drive assembly.

12. A vehicular storage unit transit system as claimed in claim 10 wherein said drive assembly is an electrically powered drive assembly.

13. A vehicular storage unit transit system as claimed in claim 11 additionally comprising a latch assembly to latch said storage unit into said first position.

14. A vehicular storage unit transit system for joining a storage unit to a vehicle possessing a cargo area having a pair of opposing sidewalls, a forward end, and an access end opposing said forward end, said transit system comprising:

a pair of guidance assemblies configured to be coupled to said sidewalls, wherein each of said guidance assemblies comprises a first section configured to sustain said storage unit in a first attitude at a first position proximate said forward end of said cargo area, a second section configured to sustain said storage unit in a second attitude at a second position proximate said access end of said cargo area, and a third section configured to guide said storage unit through a third position between said first position and said second position; and a pair of transit assemblies coupled to said guidance assemblies and configured to be coupled to said storage unit.

15. A vehicular storage unit transit system as claimed in claim 14 wherein:

said cargo area has a floor and a pair of wheelwells positioned between said sidewalls and protruding above said floor;

said wheelwells have a highest point, said highest point being a point furthest removed from said floor;

said storage unit has a lowest point, said lowest point being a point least removed from said floor;

said lowest point of said storage unit is less removed from said floor than said highest point of said wheelwells when said storage unit is in one of said first position and said second position; and said lowest point of said storage unit is more removed from said floor than said highest point of said wheelwells when said storage unit is in said third position.

16. A vehicular storage unit transit system as claimed in claim 14 wherein:

said cargo area has a floor;

said storage unit has a mounting plane;

said transit assemblies are configured to couple said storage unit to said guidance assemblies so that said mounting plane forms a first angle relative to said guidance assemblies;

said first sections of each of said guidance assemblies are coupled to said sidewalls at a second angle relative to said floor, said second angle being substantially equal in value to said first angle, so that said first attitude is substantially parallel to said floor; and said second sections of each of said guidance assemblies are coupled to said sidewalls at a third angle relative to said floor so that said second attitude is at a fourth angle relative to said floor, said fourth angle being a sum of said first angle and said third angle.

17. A vehicular storage unit transit system as claimed in claim 14 wherein:

said transit system additionally comprises a drive assembly coupled to said transit assemblies;

said third section is configured to guide said storage unit when undergoing a transit between said first position and said second position; and said transit is effected by said drive assembly.

18. A vehicular storage unit transit system for a vehicle, said vehicle possessing a cargo area having a forward end, an access end opposing said forward end, a pair of opposing sidewalls, a floor, and a pair of wheelwells positioned between said sidewalls and protruding above said floor, said wheelwells having a highest point, said highest point being a point furthest removed from said floor, said transit system comprising:

a storage unit having a mounting plane and a lowest point, said lowest point being a point least removed from said floor;

a pair of guidance assemblies configured to be coupled to said sidewalls and to guide said storage unit during a transit thereof between a first position proximate said forward end of said cargo area and a second position proximate said access end of said cargo area, said transit passing through a third position, said lowest point of said storage unit being less removed from said floor than said highest point of said wheelwells when said storage unit is in said first position and said second position, and said lowest point of said storage unit being more removed from said floor than said highest point of said wheelwells when said storage unit is in said third position, each of said guidance assemblies comprising a first section configured to sustain said storage unit in a first attitude with said mounting plane substantially parallel to said floor when said storage unit is in said first position, a second section configured to sustain said storage unit in a second attitude with said mounting plane oblique to said floor when said storage unit is in said second position, and a third section coupling said first section to said second section and configured to guide said storage unit during said transit; and a pair of transit assemblies coupled to said guidance assemblies and configured to be coupled to said storage unit.

19. A vehicular storage unit transit system as claimed in claim 18 additionally comprising an electrically powered drive assembly coupled to at least one of said transit assemblies and effecting said transit of said storage unit.

* * * * *